Patented July 24, 1951

2,561,429

UNITED STATES PATENT OFFICE 2,561,429

DISILA ORGANO COMPOUNDS

Michael Sveda, Cleveland, Ohio, assignor to E. I. du Pont de Nemours & Company, Wilmington, Del., a corporation of Delaware No Drawing. Application October 28, 1946, Serial No. 706,095

12 Claims. (Cl. 260—448.2)

This invention relates to novel organosilicon compounds and processes for producing them, and is more particularly directed to compounds having the formula

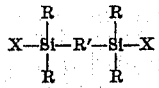

where R stands for a monovalent organic radical, R' for a divalent organic radical, and X for a halogen, hydroxyl, or —OR radical, and to processes comprising coupling to an organic dihalide of the type X—R'—X a dihalosilane disubstituted with monovalent organic radicals, by removing halide radicals from the silane and from the organic dihalide and effecting chemical combination at the points of halide removal.

Polymerizable organosilicon compounds are known to have a pronounced cyclizing tendency, that is, a tendency to form ring rather than chain polymers. This characteristic is so strong that rings containing nine —SiO— units (18-membered rings) are easily formed. To this property of the siloxane link can probably be attributed the fact that efforts to synthesize linear, high molecular weight, silicon-containing polymers from simple disubstituted silane monomers, such as $R_2SiCl_2$, $R_2Si(OR)_2$, and $R_2Si(OH)_2$, have hitherto been unsuccessful. The latter type of polymer is particularly of interest because it is linear and orientable, such polymers being the subject of my copending application Ser. No. 706,096 filed October 28, 1946.

It is therefore an object of the present invention to provide novel compounds containing siloxane groups so disposed within the molecule that their tendency to cyclize is minimized and hence that the compounds can be polymerized to give linear, high molecular weight polymers. A further object is to provide such compounds in which two silicon atoms are joined by a divalent organic group containing a plurality of carbon atoms. A further object is to provide monomeric organosilicon compounds in which each of two silicon atoms joined by a divalent organic group is also joined to a halide, hydroxyl, alkoxy or aroxy radical. A further object is to provide processes for producing such monomeric compounds. A further object is to provide such processes whereby the monomers can be produced in a substantially pure condition. Further objects will appear hereinafter.

The foregoing and other objects are accomplished according to this invention by novel monomeric compounds having the formula

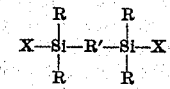

where R stands for a monovalent organic radical, R' for a divalent organic radical, and X for a halogen, hydroxyl, or —OR radical, and by processess comprising coupling to an organic dihalide of the type X—R'—X at each of the positions occupied by X a dihalosilane disubstituted with monovalent organic radicals, by removing halide radicals from the substituted halosilane and from the organic dihalide and effecting chemical combination at the points of halide removal.

It will be understood that the operation may be carried out in a single step or in a plurality of steps. Thus, one may first form a Grignard-type compound from the dihalide and then effect reaction between this Grignard and the disubstituted dihalosilane, or one may form the Grignard in situ and carry out the coupling in the same step. Alternatively, one may form a Fittig-type compound of the X—R'—X type dihalide and an active metal, such as sodium or lithium, and then effect reaction between this and the disubstituted dihalosilane, or one may carry out both of these reactions in a single step. It will be seen that the net over-all result, whether the reaction goes in one step or more than one step, is to remove halide radicals from the organic dihalide and the disubstituted dihalosilane and effect chemical combination at the points of halide removal.

In the formula

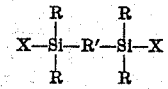

which represents monomers of this invention, R stands for a monovalent organic radical, that is, a group which contains organic carbon and has a single point of attachment to the molecule. The radical may, for instance, be aliphatic or alkyl, such as a methyl, ethyl, or longer hydrocarbon group; it may be aryl, such as phenyl, diphenyl, or tolyl; it may be unsaturated, such as allyl; it may be cycloaliphatic, such as cyclohexyl; it may be a substituted hydrocarbon group, such as cyanomethyl or halomethyl as for instance trifluoromethyl or more broadly, $C_nF_{(2n+1)}$ it may be aralkyl, such as a benzyl group.

R' in the formula stands for a divalent organic radical, that is, a group which contains organic carbon and has two points of attachment to the rest of the molecule. The radical may, for instance, be a methylene-containing radical, such as hexamethylene, or other polymethylenes; it may be arylene, such as phenylene, biphenylene, or diphenylene ether; it may be aralkylene, such as the —$CH_2C_6H_4CH_2$— group; or it may be cycloalkylene, such as the 1,4 —$C_6H_{10}$— group.

X in the formula stands for a halogen radical, such as a chloro or bromo group, or a hydroxyl radical, or an —OR radical, such as a methoxy, ethoxy, or phenoxy group, R having the same meaning as the R attached directly to the silicon atoms.

In a process of this invention for preparing novel organosilicon monomers, each of the halides of an organic dihalide of the type X—R'—X, where X stands for a halide radical and R' has the same significance as above stated for the organosilicon monomer is replaced by a dihydrocarbon-substituted monohalosilyl group. It is preferred to use an organic dihalide in which the shortest carbon chain joining the two halide radicals contains at least 2 carbon atoms. For monomers which are to be polymerized into orientable polymers it is especially preferred that the divalent —R'— radical have at least a four carbon-containing chain between the two points of halide substitution, so that in the product obtained by the halide replacement there will be at least four carbon atoms in the shortest carbon chain joining the silicon atoms. It is especially preferred that if the chain is polymethylene there be at least six carbons in such chain.

The dihalosilane which is joined with the organic dihalide according to this invention may be represented by the formula

where X stands for a halide radical, such as chloride or bromide, and R has the same significance as above stated for the organosilicon monomer. For example, when X is chloride and R is methyl, the compound is dimethyldichlorosilane,

It will be understood that the R groups in the dihalosilane, and also in the organosilicon monomer may be the same, or they may be different, that is, for example, a methyl and an ethyl radical, provided they respond to the definition for R as given.

One molecule of the dihalosilane is coupled with the dihalide at each of the halide positions according to a process of this invention. This is accomplished by removing the halide groups from the dihalide, removing a halide group from each molecule of dihalosilane, and joining the substituted silane groups so formed to the organic dihalide residue at the points of halide removal.

The desired removal of halide groups may be accomplished, for instance, by effecting contact between the dihalide and dihalosilane in the presence of an active metal. Such contact may be facilitated by having the metal in a form in which it presents a maximum of surface, such as in the form of powder, shot, flakes, leaflets, or turnings, by agitating the mixture, and by carrying out the reaction in the presence of a solvent for the reactants.

Included in the group of active metals which may be used are lithium, sodium, potassium, aluminum, calcium, magnesium and zinc. It is preferred to use sodium or magnesium, the latter being particularly preferred. The proportion of metal to use should be at least sufficient to take up two atoms of halogen per mol of dihalide and one atom of halogen per mol of dihalosilane. Since two mols of the silane are combined with one mol of dihalide to give one mol of monomer the minimum proportion of metal is four atoms of a monovalent metal, two atoms of a divalent metal, or 1⅓ atoms of a trivalent metal per mol of monomer to be formed. In practice it is preferred to use a substantial excess of metal, as, for instance, fifty per cent excess.

As a solvent for the reaction mixture there may be used any liquid inert to the reactants which is capable of dissolving at least a substantial proportion of each reactant. Organic liquids such as benzene or diethyl ether have been found suitable. In some instances the reactants are miscible, and in this case it may be desirable to provide an extra quantity of one reactant to function as a solvent. It is preferred to use a solvent such as diethyl ether which is highly volatile and is easily removed from the reaction product by distillation.

When diethyl ether is used as a solvent, the proportion of solvent to halide-substituted reactants suitably may be of the order of 1:2 by weight. Using about this proportion the reaction may be allowed to proceed at the refluxing temperature. For the reaction between paraphenylene dibromide and dimethyldichlorosilane this temperature is about from 46 to 55° C.

In another specific embodiment of a process of this invention the solvent is not used and halide removal is effected at elevated temperatures by means of metallic aluminum. This synthesis may also be combined with a telomerization reaction whereby reaction is first effected between a diorganic substituted dihalosilane and an unsaturated aliphatic hydrocarbon and the resultant product is subjected to the action of aluminum.

In another specific embodiment a diorganic-substituted dihalosilane is coupled directly to an aryl hydrocarbon in the presence of aluminum chloride as a catalyst to give the monomeric dihalide. The corresponding monomeric diol may be prepared by starting with the di-organic-substituted dihydroxysilane.

The dihalosilane used in a process of this invention may be added to the reaction mixture as such or it may be formed in situ in the reaction mixture. For instance, an organic chloride, RCl, in which the R corresponds with the desired organic substituent of the dihalosilane may be heated in the presence of silicon and another metal, as in the form of an alloy with copper or silver, and an alpha, omega organic dichloride, whereby the desired organosilicon monomer may be produced.

A further alternative is to form, by such a method as above described, a monofunctional arylsilicon derivative of the type:

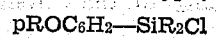

and crack this with hydrogen chloride to give

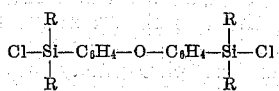

When it is desired to prepare a composition of this invention having the formula

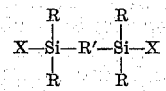

where X is a hydroxyl radical, the corresponding composition where X is a halide group is first prepared by a method such as described above and this halide monomer is then hydrolyzed to give the diol monomer. The hydrolysis may be carried out in aqueous solution in the presence of an amount of an alkali, such as sodium hydroxide, stoichiometrically equivalent to the chlorine to be hydrolyzed off the halide monomer. Other hydrogen chloride acceptors, such as pyridine, may also be used. The hydrolysis should be effected at low temperature, preferably around 0° C., and the water added to form the aqueous solution should preferably be added in the form of ice.

When it is desired that X in the formula be an alkoxy group, the dichloride may first be prepared as above described and treated with alcohol in the presence of pyridine to remove hydrogen chloride. The lower aliphatic alcohols such as methanol and ethanol may be used to especial advantage as regards cost, but compositions having special properties may also be prepared using, for instance, higher aliphatic alcohols, such as butyl alcohol, aromatic alcohols such as benzyl alcohol, and cycloaliphatic alcohols such as cyclohexanol.

The invention will be better understood by reference to the following illustrative examples.

*Example I*

The apparatus used in this preparation consisted of a vessel fitted with a thermometer, agitator, and an extraction device carrying a reflux condenser at the top and a stopcock between the extractor and the vessel. A connecting tube between the vessel and the vapor inlet at the top of the condenser permitted solvents to be circulated through vaporization and condensation.

In carrying out one embodiment of this invention 400 parts by weight (1.69 moles) of solid p-phenylene bromide was placed in the extraction device. The vessel, below, was charged with 656 parts (5.09 moles=50% excess) of dimethyldichlorosilane, 124 parts (5.09 atoms=50% excess) of metallic magnesium (Grignard grade), and 496 parts of anhydrous ethyl ether. To initiate the reaction, a trace of elemental iodine and 8 parts of methyl iodide were added to the reaction mixture contained in the vessel. The vessel was then gently warmed so that ether vapor was distilled over into the top of the condenser, the condensate running down into the extraction device containing the p-phenylene bromide. The latter dissolved in the ether, and as the ethereal solution entered the main reaction vessel, interaction between the p-phenylene bromide, dimethyldichlorosilane, and metallic magnesium occurred. Heat was generated and the reaction became self-sustaining. Ether was continuously distilled over into the extraction thimble, and re-entered the reaction vessel, carrying additional quantities of p-phenylene bromide in solution. Occasionally, it was necessary to cool the reaction vessel to moderate the reaction, so that the rate of dissolving p-phenylene bromide was such that all of it had been added over a period of five hours. Following this, the reaction mixture was refluxed for an additional four hours.

As the reaction proceeded, a mixture of magnesium bromide and chloride precipitated. After the reaction had been completed, the magnesium halides were separated by filtration under anhydrous conditions, to prevent hydrolysis of the main reaction product. The precipitate was washed with 1200 parts of anhydrous benzene.

To isolate the reaction product, the ethyl ether and benzene were removed by distillation at atmospheric pressure. During this distillation, additional quantities of magnesium halides precipitated and were removed periodically.

Following removal of solvents, the residue was purified by vacuum distillation whereupon a quantity of p-phenylene-bis-(dimethylchlorosilane) was obtained as a solid melting at 87° C. and boiling at 110° C. under 1.5 mm.

*Example II*

The p-phenylene-bis-(dimethylchlorosilane) thus obtained was hydrolyzed to p-phenylene-bis-(hydroxydimethylsilane) in cooled ethyl ether solution by treating it with a stoichiometric quantity of aqueous sodium hydroxide. Thus, 13.6 parts of p-phenylene-bis-(dimethylchlorosilane) dissolved in 140 parts of anhydrous ether was added over a period of 9 minutes to 69 parts of 1.5 normal aqueous sodium hydroxide, the temperature of the latter being maintained at approximately 0° C. After thorough mixing, the ether solution was immediately separated, and the aqueous layer was extracted with an additional 72 parts of ethyl ether. The combined ether layers were immediately dried with 20 parts of anhydrous potassium carbonate.

Isolation of the desired product was finally accomplished by concentration of the ethereal solution under vacuum until crystals began to appear. These were removed by filtration, and further quantities of product were isolated by addition of benzene to the mother liquor. A quantity of the p-phenylene-bis-(hydroxydimethylsilane) was thus obtained, which melted at 135° C.

Analytical data indicating the identity of this compound are:

|  | Calculated | Found |
| --- | --- | --- |
| Si | 24.79 | 24.47 |
| C | 53.05 | 53.20 |
| H | 8.01 | 8.01 |
| O (By difference) | 14.14 | 14.32 |
| Mol. Wt. (in glacial acetic acid) | 226.4 | 222 |

*Example III*

This compound was prepared by coupling dimethyldichlorosilane and hexamethylenechloride with metallic magnesium in ethyl ether.

A mixture of 62.3 parts (0.483 mole=50% excess) of dimethyldichlorosilane, 48.6 parts (2 atoms=50% excess) of metallic magnesium (Grignard grade) in 25 parts of anhydrous ethyl ether was treated with 155 parts (0.161 mole) of hexamethylenedichloride dissolved in 18 parts of anhydrous ethyl ether. Thorough precautions were taken to maintain the reaction in anhydrous condition. The magnesium had been pretreated with iodine vapor for activation, and a small amount of methyl iodide was later added to help initiate the reaction.

After the ethereal solution of hexamethylenedichloride had been added over 2.5 hours, while maintaining the reaction mixture at 52° C., the precipitated magnesium chloride was removed, by first diluting the reaction mixture with 60 parts of anhydrous benzene, followed by filtration.

Solvents were removed in the usual manner, by atmospheric distillation and a quantity of 1,6-hexamethylene-bis-(chlorodimethylsilane) was isolated by vacuum distillation, a boiling point of 110° C. being obtained under a pressure of 2 mm.

*Example IV*

This compound was prepared by hydrolysis of the 1,6-hexamethylene-bis-(chlorodimethylsilane) of Example III, in cooled ethereal solution, with aqueous sodium hydroxide.

The hydrolysis was performed by dissolving 5.5 parts of 1,6-hexamethylene-bis-(chlorodimethylsilane) in 80 parts of anhydrous ether, and then slowly adding the resulting solution to a mixture of 62 parts of 1.5 normal aqueous sodium hydroxide, and 42 parts of ether maintained below 10° C.

The ethereal layer was immediately separated and dried with 19 parts of anhydrous potassium carbonate. Following removal of the ether by evaporation by vacuum, at room temperature, the crude hydrolysis product was crystallized from a mixture of carbon tetrachloride and benzene.

Analytical data supporting the identity of this compound are:

|   | Calculated | Found |
|---|---|---|
|   | Percent | Percent |
| C | 51.24 | 51.4 |
| Si | 23.94 | 23.6 |

I claim:

1. A composition having the formula

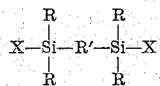

where R stands for a monovalent organic radical selected from the group consisting of methyl, ethyl, and phenyl, R' for the paraphenylene radical, and X is a member of the group consisting of a halogen, hydroxyl, and OR radicals.

2. A composition having the formula

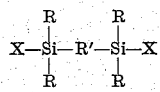

where R stands for a methyl radical, R' for the paraphenylene radical, and X for a hydroxyl radical.

3. A composition having the formula

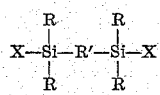

where R stands for a phenyl radical, R' for the paraphenylene radical, and X for a hydroxyl radical.

4. A composition having the formula

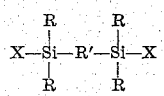

where R stands for a monovalent organic radical, selected from the group consisting of methyl, ethyl, and phenyl, R' for a divalent organic radical joining the two silicon atoms by a carbon chain, the radical being selected from the group consisting of the para-phenylene radical, the para-biphenylene radical, the para-diphenylene ether radical, the para-xylylene radical, the 1,4-cyclohexyl radical, and straight chain polymethylene radicals in which at least 6 carbon atoms are in a chain between and joining the two silicon atoms, and X is a member of the group consisting of halogen, hydroxyl, and OR radicals.

5. A composition having the formula

where R stands for a monovalent organic radical selected from the group consisting of methyl, ethyl, and phenyl, R' for a straight polymethylene radical in which at least 6 carbon atoms are in a chain between and joining the two silicons, and X is a member of the group consisting of halogen, hydroxyl, and OR radicals.

6. In a process for producing compounds having the formula

where R stands for a monovalent organic radical selected from the group consisting of methyl, ethyl, and phenyl, R' for a divalent organic radical joining the two silicon atoms by a carbon chain, the radical being selected from the group consisting of the para-phenylene radical, the para-biphenylene radical, the para-diphenylene ether radical, the para-xylylene radical, the 1,4-cyclohexyl radical, and straight chain polymethylene radicals in which at least 6 carbon atoms are in a chain between and joining the two silicon atoms, and X is a halogen radical, the step comprising coupling to an organic dihalide of the type X—R'—X at each of the halide positions a dihalosilane disubstituted with monovalent organic radicals, by effecting contact between the organic dihalide, a dihalosilane disubstituted with monovalent organic radicals, and an active metal selected from the group consisting of lithium, sodium, potassium, aluminium, calcium, magnesium and zinc, in the proportion of at least two mols of silane and four gram equivalent weights of metal per mol of organic dihalide, whereby halide radicals are removed by the metal from the silane and from the X—R'—X— type dihalide and chemical combination is effected at the points of halide removal.

7. In a process for producing a compound having the formula

where R stands for a monovalent organic radical selected from the group consisting of methyl, ethyl, and phenyl, R' for a divalent organic radical joining the two silicon atoms by a carbon chain, the radical being selected from the group consisting of the para-phenylene radical, the para-biphenylene radical, the para-diphenylene ether radical, the para-xylylene radical, the 1,4-cyclohexyl radical, and straight chain polymethylene radicals in which at least 6 carbon atoms are in a chain between and joining two silicon atoms, and X is a halogen radical, the step comprising coupling to an organic dihalide of the type X—R'—X at each of the halide positions a dihalosilane disubstituted with monovalent organic radicals by effecting contact between the organic dihalide, a dihalosilane disubstituted with monovalent organic radicals, and magnesium, in the proportion of at least two mols of silane and four gram equivalent weights of magnesium per mol of organic dihalide, whereby halide radicals are removed by the magnesium from the silane and from the X—R'—X— type dihalide and chemical combination is effected at the points of halide removal.

8. In a process for producing a compound having the formula

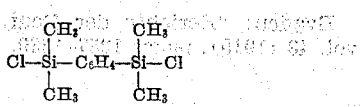

the step comprising effecting contact between 1,4 dichlorobenzene, dimethyl dichlorosilane, and dispersed metallic magnesium, in the proportion of at least two mols of silane and four gram equivalent weights of magnesium per mol of dichlorobenzene, in diethyl ether solution at the refluxing temperature, whereby chloride radicals combine with the magnesium and are removed from the silane and the dichlorobenzene and chemical combination is effected at the points of chloride removal.

9. In a process for producing compounds having the formula

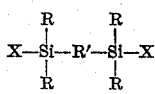

where R stands for a monovalent organic radical selected from the group consisting of methyl, ethyl, and phenyl, R' for a divalent organic radical joining the two silicon atoms by a carbon chain, the radical being selected from the group consisting of the para-phenylene radical, the para-biphenylene radical, the para-diphenylene ether radical, the para-xylylene radical, the 1,4-cyclohexyl radical, and straight chain polymethylene radicals in which at least 6 carbon atoms are in a chain between and joining the two silicon atoms and X for a hydroxyl radical, the steps comprising coupling to an organic dihalide of the type halide—R'—halide at each of the alpha and omega positions a dihalosilane disubstituted with monovalent organic radicals, by effecting contact between the silane, the dihalide, and an active metal selected from the group consisting of lithium, sodium, potassium, aluminum, calcium, magnesium and zinc, in the proportion of at least two mols of silane and four gram equivalent weights of metal per mol of organic dihalide, whereby a compound of the type

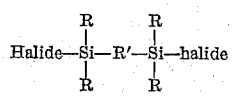

is produced, and hydrolyzing off the halide radicals of this compound whereby they are replaced with hydroxyl radicals.

10. In a process for producing compounds having the formula

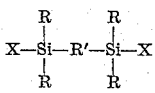

where R stands for a monovalent organic radical selected from the group consisting of methyl, ethyl, and phenyl, R' for a divalent organic radical joining the two silicon atoms by a carbon chain, the radical being selected from the group consisting of the para-phenylene radical, the para-biphenylene radical, the para-diphenylene ether radical, the para-xylylene radical, the 1,4-cyclohexyl radical, and straight chain polymethylene radicals in which at least 6 carbon atoms are in a chain between and joining the two silicon atoms, and X for a hydroxyl radical, the steps comprising coupling to an organic dihalide of the type halide—R'—halide at each of the alpha and omega positions a dihalosilane disubstituted with monovalent organic radicals, by effecting contact between the silane, the dihalide, and an active metal selected from the group consisting of lithium, sodium, potassium, aluminum, calcium, magnesium and zinc, in the proportion of at least two mols of silane and four gram equivalent weights of metal per mol of organic dihalide, whereby a compound of the type

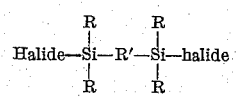

is produced, and hydrolyzing off the halide radicals of this compound by adding water and a hydrogen halide acceptor while maintaining the temperature at about 0° C., whereby the halide radicals are replaced by hydroxyl radicals.

11. In a process for producing a compound having the formula

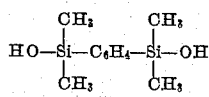

the steps comprising effecting contact between 1,4 dibromobenzene, dimethyldichlorosilane, and dispersed metallic magnesium, in the proportion of at least two mols of silane and four gram equivalent weights of magnesium per mol of dibromobenzene, in diethyl ether solution at the refluxing temperature, whereby chloride and bromide radicals combine with the magnesium and are removed from the silane and the dibromobenzene respectively and chemical combination is effected at the points of chloride and bromide removal to give phenylene-bis-dimethyl chlorosilane, and hydrolyzing off the chloride radicals by adding water and a stoichiometrically equivalent amount of sodium hydroxide while maintaining the temperature at about 0° C., whereby the halide radicals are replaced by hydroxyl radicals.

12. In a process for producing compounds having the formula

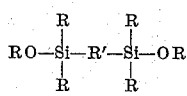

where R stands for a monovalent organic radical selected from the group consisting of methyl, ethyl, and phenyl and R' stands for a divalent organic radical joining the two silicon atoms by a carbon chain, the radical being selected from the group consisting of the para-phenylene radical, the para-biphenylene radical, the para-diphenylene ether radical, the para-xylylene radical, the 1,4-cyclohexyl radical, and straight chain polymethylene radicals containing at least 6 carbon atoms are in a chain between and joining the two silicon atoms, and the steps comprising coupling to an organic dihalide of the type halide—R'—halide at each of the alpha and omega positions a dihalosilane disubstituted with monovalent organic radicals, by effecting contact between the silane, the dihalide, and an active metal selected from the group consisting of lithium, sodium, potassium, aluminum, calcium, magnesium and zinc, in the proportion of at least two mols of silane and four gram equivalent weights of metal per mol of organic dihalide, whereby a compound of the type

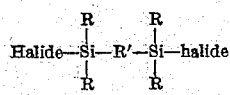

is produced, and substituting ester groups for the halide radicals of this compound by effecting contact between the compound and an alcohol having the formula R—OH and removing hydrogen halide.

MICHAEL SVEDA.

REFERENCES CITED

The following references are of record in the file of this patent:

UNITED STATES PATENTS

| Number | Name | Date |
|---|---|---|
| 2,352,974 | Rochow | July 4, 1944 |
| 2,381,000 | Patnode | Aug. 7, 1945 |
| 2,426,122 | Rust | Aug. 19, 1947 |

OTHER REFERENCES

Bygden: "Berichte der Deut. Chem. Gesell," vol. 48 (1915), pages 1237–1239.